US011233835B1

(12) United States Patent
Facusselentz (10) Patent No.: US 11,233,835 B1
(45) Date of Patent: Jan. 25, 2022

(54) SYSTEM AND METHOD FOR REMOTE REAL-TIME CONTENT CREATION

(71) Applicant: Antoine Pierre Facusselentz, Los Angeles, CA (US)

(72) Inventor: Antoine Pierre Facusselentz, Los Angeles, CA (US)

(*) Notice: Subject to any disclaimer, the term of this patent is extended or adjusted under 35 U.S.C. 154(b) by 0 days.

(21) Appl. No.: 17/099,337

(22) Filed: Nov. 16, 2020

(51) Int. Cl.
*G06F 15/16* (2006.01)
*H04L 29/06* (2006.01)

(52) U.S. Cl.
CPC ...... *H04L 65/4069* (2013.01); *H04L 65/1066* (2013.01)

(58) Field of Classification Search
CPC .................. H04L 65/1066; H04L 65/4069
USPC .................................................. 709/203, 219
See application file for complete search history.

(56) References Cited

U.S. PATENT DOCUMENTS

| | | | |
|---|---|---|---|
| 9,240,214 B2* | 1/2016 | Hannuksela | H04N 21/23418 |
| 2011/0075612 A1* | 3/2011 | Guo | H04L 67/26 |
| | | | 370/329 |
| 2014/0129676 A1* | 5/2014 | Zeng | G06Q 50/01 |
| | | | 709/217 |
| 2015/0089020 A1* | 3/2015 | Altman | H04L 65/4084 |
| | | | 709/217 |
| 2018/0225537 A1* | 8/2018 | Cole | H04N 5/268 |
| 2020/0236274 A1* | 7/2020 | Cowell | H04N 5/23206 |
| 2020/0274906 A1* | 8/2020 | Baylis | H04L 67/146 |

* cited by examiner

*Primary Examiner* — Duyen M Doan
(74) *Attorney, Agent, or Firm* — Zhen Law Firm; Chris J. Zhen (57) ABSTRACT

A method implemented on a video content creation device is disclosed. The method receiving a query for a set of active video content creation devices. The method may include receiving a selection of one of the set of active video content creation devices. The method may include initializing a connection for streaming video content from a remote video content creation device. The method may include receiving a command for a physical movement of a user of the remote video content creation device. The method may include sending the command to the remote video content creation device.

13 Claims, 12 Drawing Sheets

SYSTEM AND METHOD FOR REMOTE REAL-TIME CONTENT CREATION

BACKGROUND

Field

The present disclosure relates to peer-to-peer mobile applications, and more particularly but not exclusively to remote real-time content creation via mobile devices.

Background

Social media platforms provide an abundance of content from a variety of, with opportunities for content creators to monetize their content. The content, however, is typically self-directed. In other instances, with webcams—the content is at fixed locations. The available platforms have many limitations.

However, there remains a need to provide more customized content creation with monetization for the content creators.

SUMMARY

In an aspect of the disclosure, a method implemented on a video content creation device is provided. The method may include receiving a query for a set of active video content creation devices. The method may include receiving a selection of one of the set of active video content creation devices. The method may include initializing a connection for streaming video content from a remote video content creation device. The method may include receiving a command for a physical movement of a user of the remote video content creation device. The method may include sending the command to the remote video content creation device.

In another aspect of the disclosure, a method implemented on a video content creation device is provided. The method may include sending, at the video content creation device, an indication of availability to stream video content. The method may include receiving a connection request from a remote device. The method may include initializing a connection for streaming video content to the remote video device. The method may include receiving a command for a physical movement from the remote video device.

BRIEF DESCRIPTION OF THE DRAWINGS

The present disclosure is illustrated by way of example, and not by way of limitation, and may be more fully understood with reference to the following detailed description when considered in connection with the figures below.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Methods and systems are provided for payment and sharing of live peer-to-peer video content. In this disclosure, a receiving device may be used interchangeably with viewer, user, payer, etc. The transmitting or sharing device may be used interchangeably with sender, content creator, content creator device, mobile device, smart phone, tablet, etc.

Social media, mobile applications, peer-to-peer money transfer, and streaming services have exploded in popularity in recent years. This disclosure seeks to combine the best aspects of these popular technologies to provide a powerful platform for peer-to-peer payment and sharing of live video streams or feeds. Users present (the content creator) at popular events or locations may offer to stream video via their devices to others for a fee. The shared content may be shared with one or more other users. In some embodiments, the paying user receiving the video content may also request control over the recording device or control of the content creator to direct the content creator to move in certain physical directions.

In some embodiments, the control may be performed manually, such as, by the paying user giving commands (e.g., voice command, user interface inputs, etc.) to the content creator. In other embodiments, the control over the content creator and the content creator's device may be automatic. For example, the physical orientation of the paying user may be tracked (e.g., by accelerometers, eye tracking, etc.) with the tracking information transmitted to the content creator's device. The content creator's device may automatically reorient itself (e.g., via motors or other means) or focus on viewer areas based on the eye tracking of the payer.

Figure 1:
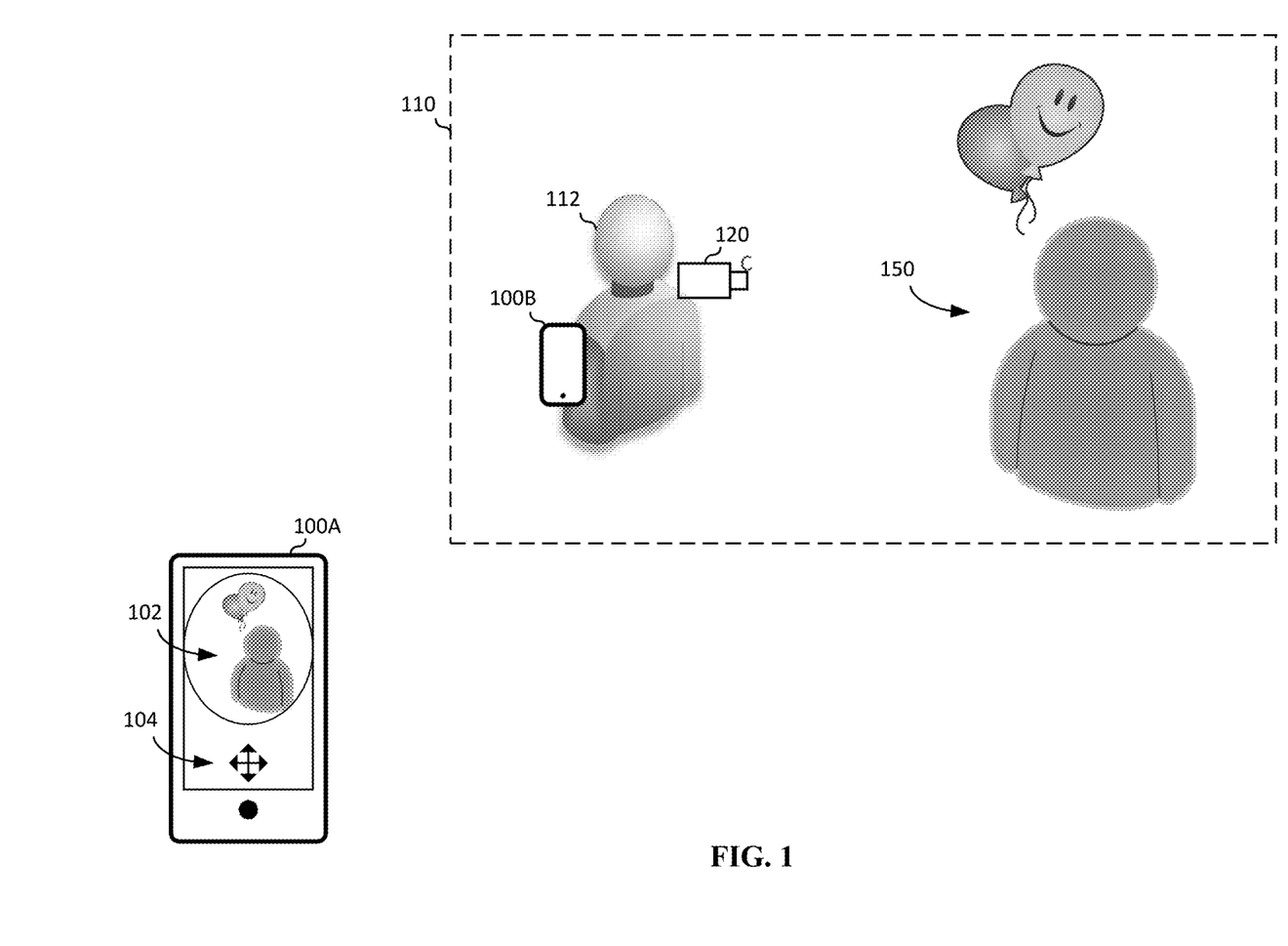
FIG. 1 illustrates an example peer-to-peer video sharing mobile application system with a viewer on one mobile device and a creator on another mobile device, according to an embodiment of the disclosure.

FIG. 1 illustrates an example peer-to-peer video sharing mobile application system with a viewer on one mobile device 100A and a content creator 112 on another mobile device 100B, according to an embodiment of the disclosure. A person 112 located at a popular venue or event 110 may offer to share live stream of content at the popular venue or event 110 for monetary compensation. A user of the mobile application system may see a list of available content creators (e.g., at various popular venues or events) and select the user 112 at the event 110 to view live content at the event 110. In some embodiments, the user may make a payment to the content creator 112 prior to receiving the live content.

As illustrated in FIG. 1, the event 110 may include some famous person or celebrity 150. The content creator 112 has enabled live streaming of the event 110 in exchange for payment of a fee. When a user selects the event 110 and makes the payment, the user sees a live stream 102 of the event that is relayed by the content creator 112. In some embodiments, the recording device may be the same mobile device 110B used for payment and interfacing with the video sharing mobile application system. In some embodiments, the recording device may be a separate device such as a camcorder carried by the content creator 112. It will be appreciated by those skilled in the art that the content creation may be accomplished in any number of ways. Further, the description of streaming for events and locations is provided by way of example and not limitation. One skilled in the art will recognize the disclosure may be applicable to any type of content, including online content, digital content so that the content creator or streamer may provide any type of media for the viewers. For example, an event or location may be a virtual online event.

In some embodiments, the user device 100A may provide physical controls 104 to direct the content creator 112. Direction may be provided for movement of the content creator 112 (e.g., move around, turn around, etc.) or to orient the content creator device 100B (e.g., rotation or movement of the device 100B). The content creator 112 may receive these directions visually (e.g., instructions/signals displayed on the device 100B), audibly (through the device 100B speaker, via earbuds, etc.), or through tactile/haptic/physical feedback, etc.

As shown in FIG. 1, the user device 100A may include user interface elements (e.g., the arrow 104 shown on the device 100A) to direct the content creator 112. On the content creator's device 100B, the prompts associated with the direction controls may be communication, e.g., visually or audibly. The content creator 112 may follow the directions as desired by the user.

Figure 2:
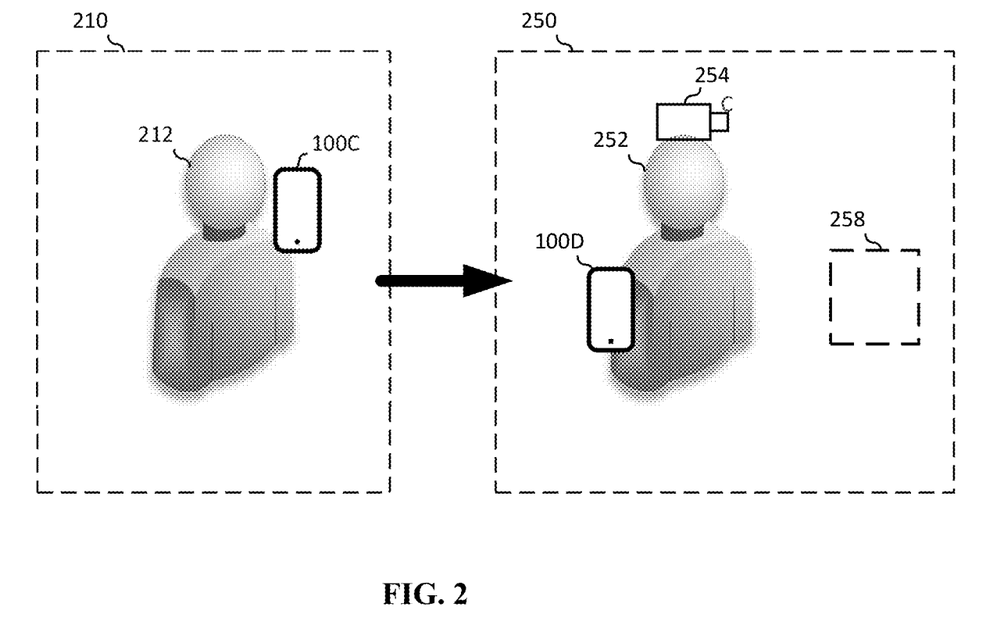
FIG. 2 illustrates another example peer-to-peer video sharing mobile application system with a viewer on one mobile device and a creator on another mobile device, with the creator device mimicking the real-time movements of the viewer device, according to an embodiment of the disclosure.

FIG. 2 illustrates another example peer-to-peer video sharing mobile application system with a viewer 212 on one mobile device 100C and a content creator 252 on another mobile device 100D, with the content creator device 100D mimicking the real-time movements of the viewer device 100C, according to an embodiment of the disclosure. The viewer 212 may be at a first location 210 and the content creator 252 may be at a second location 250. In the embodiment of FIG. 1, the viewer directed the content creator using manual user interface controls. In the embodiment of FIG. 2, the controls may be automatic based on automated tracking of the user. For example the user device 100C may include accelerometers to track the motion and orientation of the user device 100C or eye-tracking to follow the gaze of the user 212 to determine movement or a viewing orientation desired by the user 212. In another example, when the user is wearing the user device 100C as a head-mounted display (not shown), the user device 100C may the head movements or eye movements to determine the viewing orientation or subject area by the user 212. The tracking information is then sent to the content creator device 100D. In some embodiments, the content creator 252 may be equipped with a motor-actuated recording device 254 that is enabled to track the viewing orientation desired by the user 212. For example, when the user 212 turns left, that left movement is communicated to the content creator device 100D, which controls the recording device 254 to rotate left. In other embodiments, the recording device may have sufficiently large viewing port that control is based on manipulating a zoom area of the viewing port. In other embodiments, the content creator device 100D may be a 360-degree camera or the content creator device 100D may be coupled to or in communication with a 360-degree camera to provide complete viewing freedom.

In yet other embodiments, the user 212 may desire the content creator 100D to move physically from one spot to another. This may be achieved through manual user interface control as in FIG. 1 or automated means. For example, in some embodiments, the content creator 100D may be mounted on a mobility carrier (e.g., scooter, mobile platform, etc.) The user device 100C may track the physical movement of the user 212 and communicate the movement to the content creator device 100D. The content creator device 100D may in turn control the mobility carrier to track the movement of the user 212. In this manner, the system may provide for more immersive control by the user 212.

In some embodiments, the content creator 252 may provide concierge-like services. For example, the content creator 252 may provide actions to enable the viewer 210 to interact with objects or items 258 in the vicinity of the content creator 252. For example, the item 258 may be an electronic gadget that the viewer 212 would like to examine. In such an example, the viewer 212 may provide commands (either automated or manual) to the content creator 252 to interact with the gadget. As another example, the item 258 may be clothing that the viewer may desire to examine. The viewer device 100C may provide any type or number of controls to the viewer 212 to direct the content creator to interact with the clothing—for example, such controls may include commanding the content creator to try on the clothing, to view the outside or inside of the clothing, to measure the size or shape of the clothing, etc. Commands or instructions may be received from the viewer 212 in any number of ways including GUI elements (e.g., icons, arrows, etc.) through touch input, voice command, physical tracking of the user, or as described above, etc.

Content creators who have special or limited access to certain areas or events may be able to provide the special access to viewers otherwise lacking such access. In such instances, the content creators provide a valuable service that may be compensated by the viewers.

One skilled in the art will recognize that control and direction of the content creator device may be achieved in any number of ways, whether through physical controls or software controls.

It will be appreciated that control of the content creator device may be achieve in numerous ways. The figures are merely exemplary, and other methods to achieve the immersive control are possible. In one example, the content creator device may be fully automated, such as a drone (or unmanned aerial vehicle). Popular locations or events may deploy any number of drones for control by user devices. The user devices may pay to take control of the drones, with control effected in a similar manner to that described in FIGS. 1-2. For example, the control may be manual through user interface inputs or the control may be automated through tracking the user. The controls may be communicated to the drone to direct the drone to physically move about or to orient the camera on the drone.

Figure 3A:
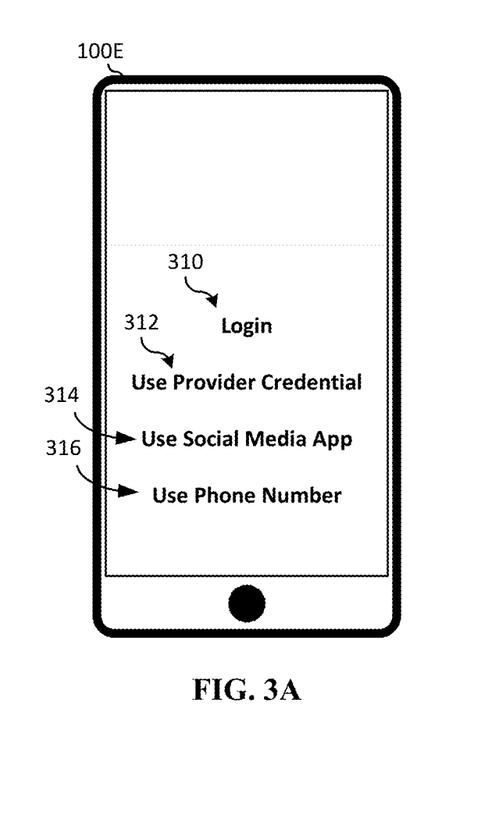
FIGS. 3A-B illustrate example displays of the mobile application, including a login screen (FIG. 3A) and map search (FIG. 3B), used for video sharing, according to an embodiment of the disclosure.
Figure 3B:
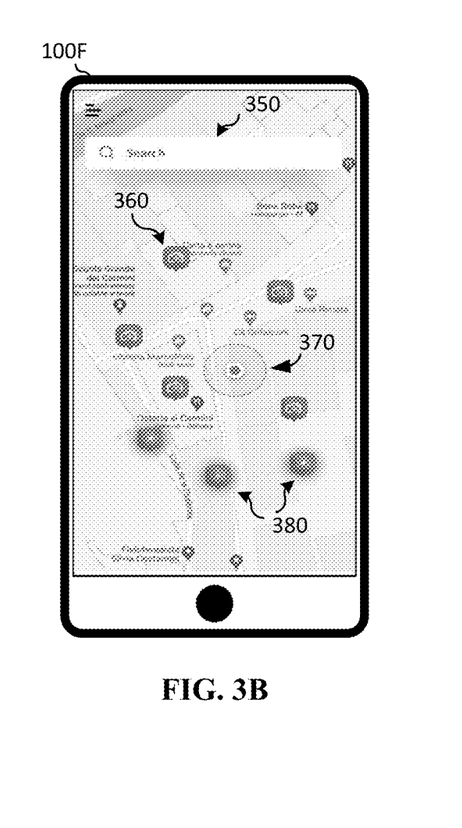

FIGS. 3A-B illustrate example displays of the mobile application, including a login screen (FIG. 3A) and map search (FIG. 3B), used for video sharing, according to an embodiment of the disclosure. The mobile application for the user device 100E may provide a convenient user interface for the features of the embodiments. In FIG. 3A is shown a login screen 310 with the prompts to start the application using a variety of credentials including the cell provider credentials 312, social media provider 314 credentials, or the phone number 316 of the mobile device 100E. Once the user starts the application, they are provided with all the features to enable viewing and sharing live video content.

In FIG. 3B is shown a live map view of users and devices 360 (e.g., content creators) superimposed on a map view of an area. The user 370 is indicated on the map with a marker 370. In instances where the user 370 is not within the map area, the user marker 370 may be omitted. Surges in popularity of a location or event (e.g., trending or viral) may be indicated on the map with special markers 380. The surge in popularity may be determined based on any number of methods, including based on searches for the location or event, frequency of payments for streaming from the location or event, prices of the streams, etc. The user may select a point of interest to being the process to view a stream form the co-located device. A search bar 350 is provided that allows natural language input to search for (or query for) places and events of interest and the users, hosts, or devices providing for streaming at these places and events of interests—these searches may be keyword searches for the events of interest, map locations, etc. The user may select one of the markers, either pre-populated or found through the search to initiate request for a stream.

Figure 4A:
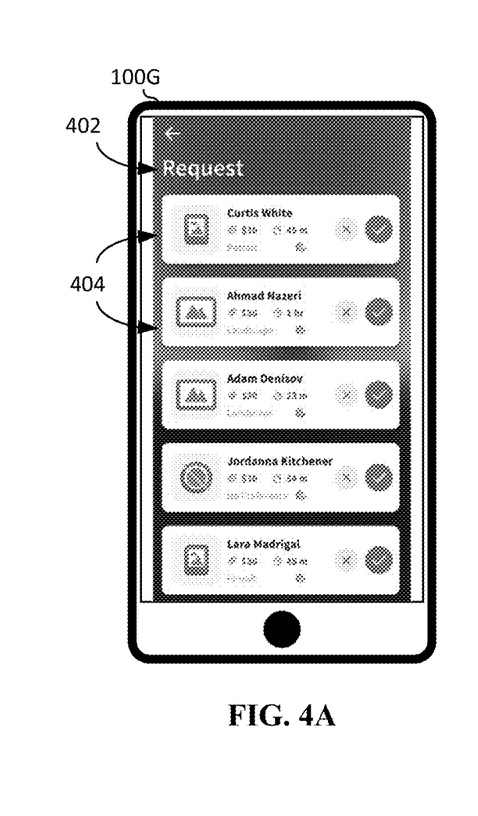
FIGS. 4A-C illustrate example displays of the mobile application, including mobile payment screens (FIG. 4A), role switching (FIG. 4B), and a request screen (FIG. 4C), used for video sharing, according to an embodiment of the disclosure.
Figure 4B:
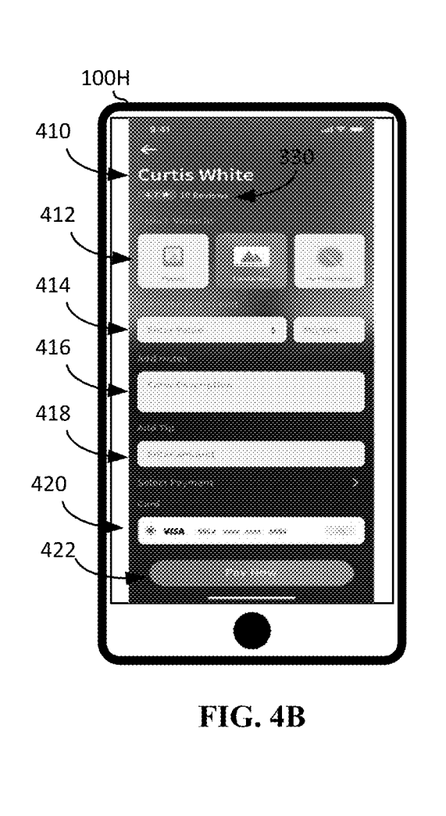
Figure 4C:
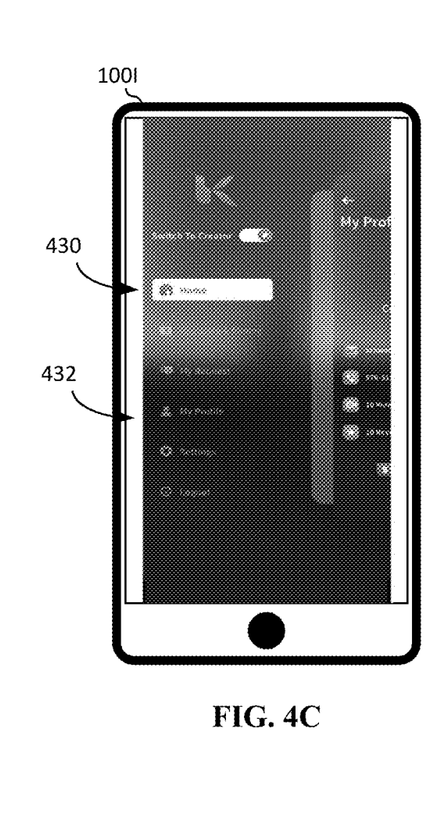

FIGS. 4A-C illustrate example displays of the mobile application, including and a request screen (FIG. 4A), mobile payment screens (FIG. 4B), role switching (FIG. 4C), used for video sharing, according to an embodiment of the disclosure.

In FIG. 4A is shown a request screen. For example, a user may request a list of available content creators available to provide live streams. The request screen 402 may be populated through a search (e.g., a user search for an area or type of event of interest) or some other means to populate the screen. Based on the list, the user may select one of a number of available 404 content creators. For each content creator 404, the type of feed, available devices, costs, payment methods, time duration, location, popularity (or trending indicator), etc. may be presented along with each content creator. Upon selection of a content creator 404, the user may be presented with the payment screen of FIG. 4B. In other embodiments, the screen may include any combination of information, excluding or all of the items shown in FIG. 4B, and/or showing any number of items not listed in FIG. 4B such as location address, event name, etc.

In FIG. 4B, the payment screen may show the user name 410 of the content creator, device attributes such as viewing mode 412 (e.g., portrait, landscape), price point 414 the user desires to pay, notes 416, tip payment 418, payment method 420, payment submission button 422.

In FIG. 4A is shown a switch screen to enable the user to scroll through the various menus including the home 430 screen, and other screens 432 such as the profile, settings, requests, etc.

Figure 5A:
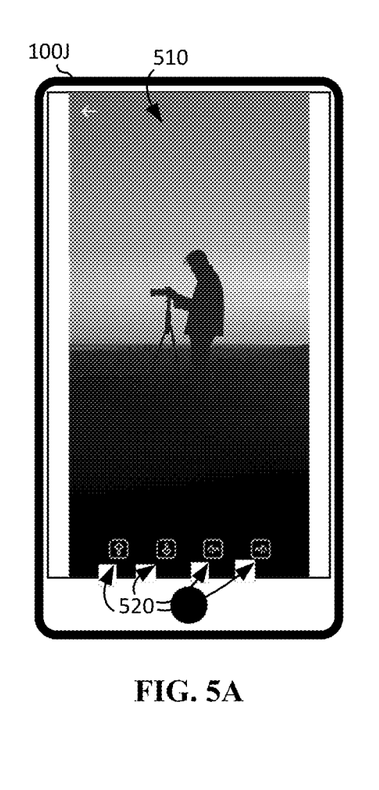
FIGS. 5A-B illustrate example displays of the mobile application, including a viewer control screen (FIG. 5A) and a record screen (FIG. 5B), used for video sharing, according to an embodiment of the disclosure.
Figure 5B:
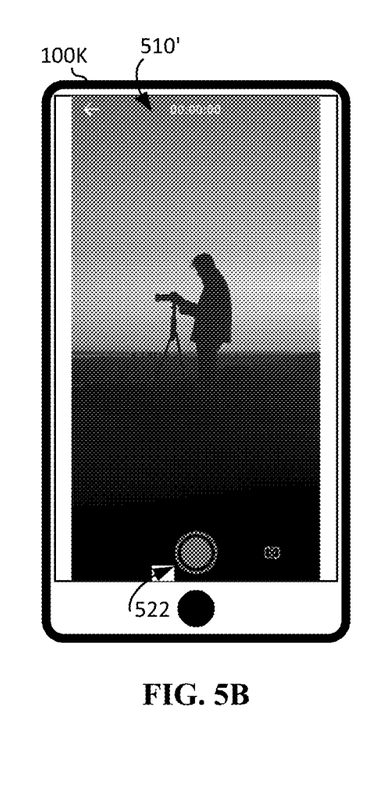

FIGS. 5A-B illustrate example displays of the mobile application, including a viewer control screen (FIG. 5A) and a recording screen (FIG. 5B), used for video sharing, according to an embodiment of the disclosure. The user device 100J may be in a streaming mode receiving live content from a remote content creator device. The sample screen 510 shown is the view from the remote content creator device. The user device 100J may include controls 520 to direct the content creator or to direct the content creator to orient the device. While the example of FIG. 5A shows only one set of controls 520, the disclosure is not so limited, and one skilled in the art will recognize that any number and types of controls may be shown in various manners to provide better control and direction of the content creator device. For example, in some embodiments, two sets of control interface elements may be shown with one set to direct the content creator person, and another set to direct the content creator to positions or orient the device.

In FIG. 5B another sample screen 510' is shown to enable the user to record the live view while watching the content. A record button 522 is shown to enable and disable the recording feature.

Figure 6A:
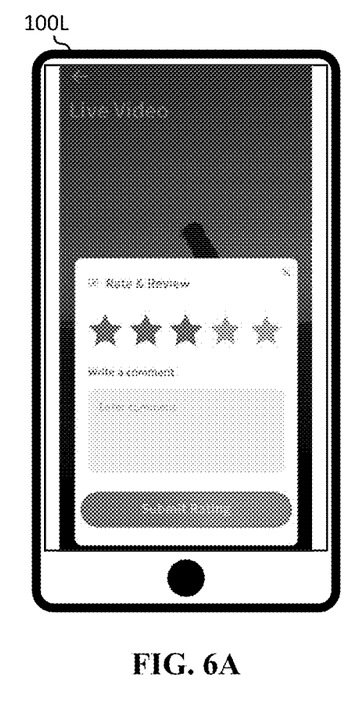
FIGS. 6A-C illustrate example displays of the mobile application, including a feedback or rating screen (FIG. 6A) request history screen (FIG. 6B), and a request rating screen (FIG. 6C), used for video sharing, according to an embodiment of the disclosure.
Figure 6B:
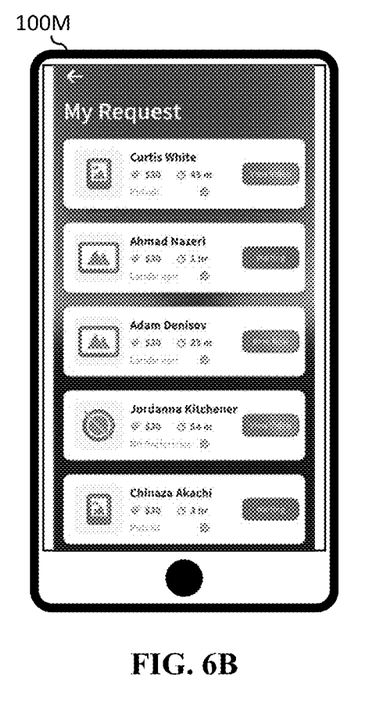
Figure 6C:
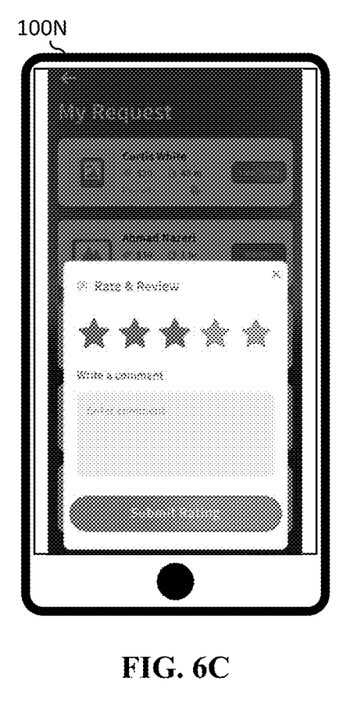

FIGS. 6A-C illustrate example displays of the mobile application, including a feedback or rating screen (FIG. 6A) request history screen (FIG. 6B), and a request rating screen (FIG. 6C), used for video sharing, according to an embodiment of the disclosure.

In FIG. 6A is shown a rate and review screen for a user to provide feedback for the most recent content creator. In FIG. 6B is shown a history of requested streams, providing an option for the user to re-view any of the past streams. In FIG. 6C is shown a rate and review screen for past content creators, providing an option for the user to review any of the past streams.

Figure 7A:
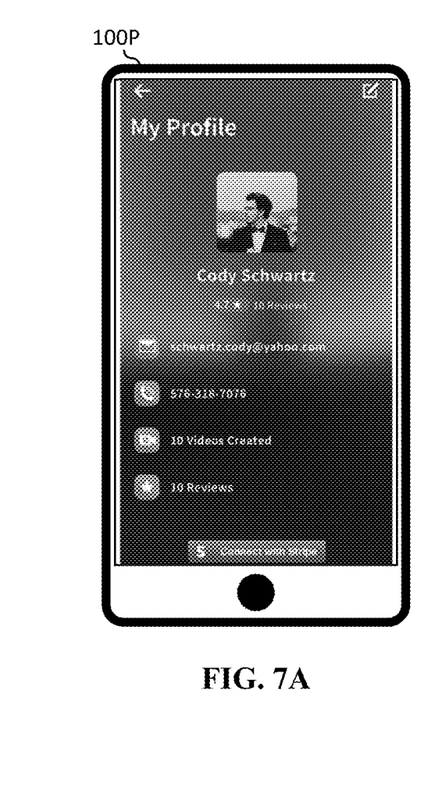
FIGS. 7A-B illustrate example displays of the mobile application, including a profile view screen (FIG. 7A) and a user settings screen (FIG. 7B), used for video sharing, according to an embodiment of the disclosure.
Figure 7B:
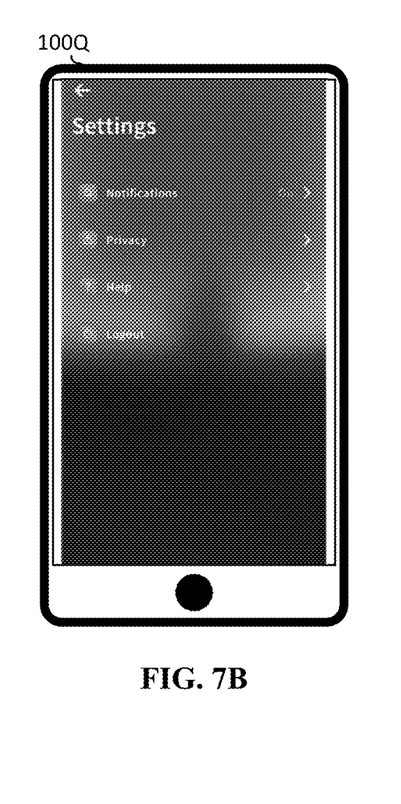

FIGS. 7A-B illustrate example displays of the mobile application, including a profile view screen (FIG. 7A) and a user settings screen (FIG. 7B), used for video sharing, according to an embodiment of the disclosure.

Figure 8:
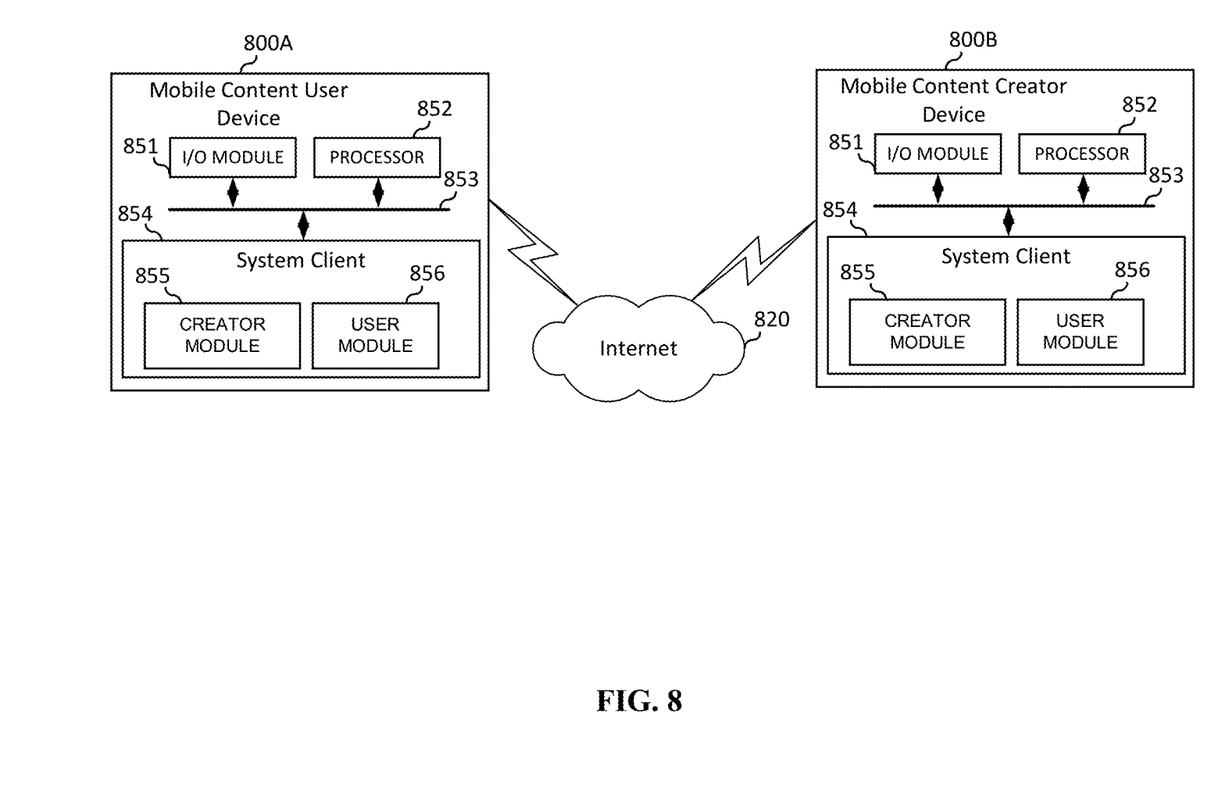
FIG. 8 illustrates an example peer-to-peer video sharing mobile application system including two devices, with a receiving device and creator device, according to an embodiment of the disclosure.

FIG. 8 illustrates an example peer-to-peer video sharing mobile application system including two devices, with a receiving device and creator device, according to an embodiment of the disclosure.

Figure 9:
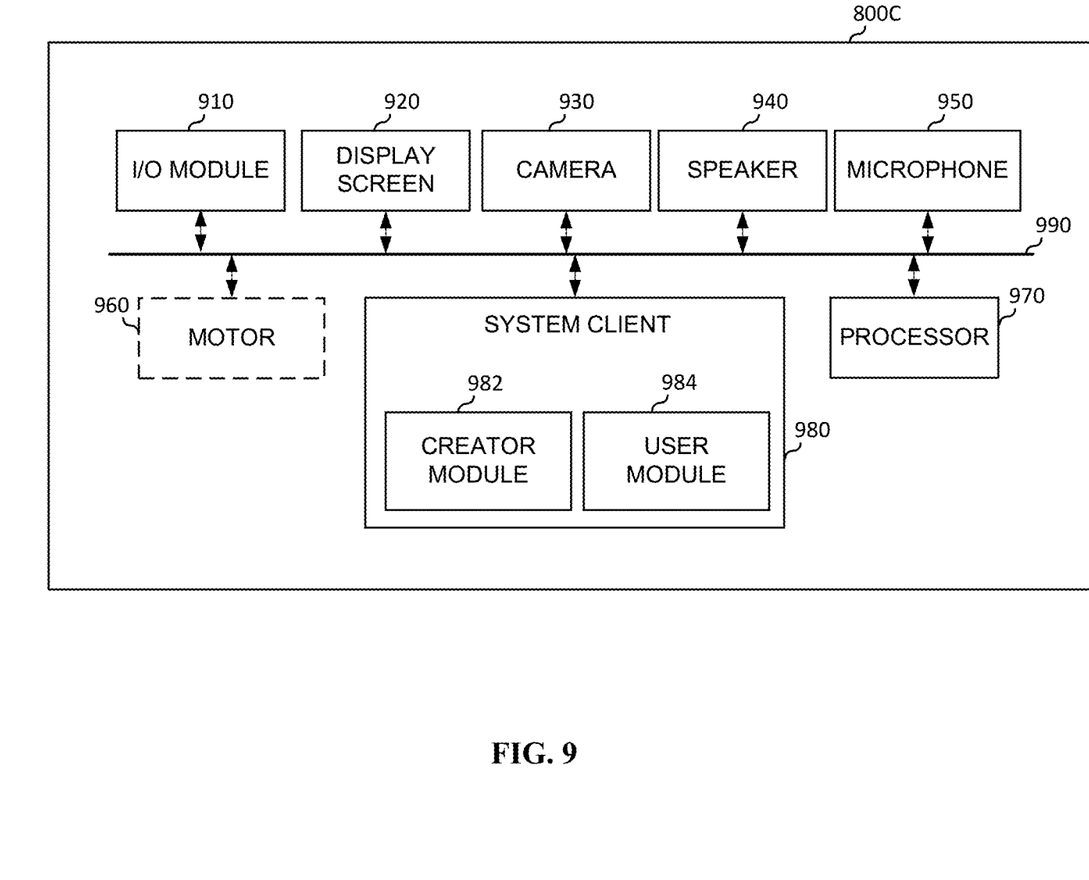
FIG. 9 is an example block diagram of a video creation device, according to an embodiment of the disclosure.

FIG. 9 is an example block diagram of a video content creation device 800C, according to an embodiment of the disclosure. The video content creation device 800C may be used as the user device 800A or creator device 800B of FIG. 8.

Mobile content user device 800C may include processor 952, I/O module 910, display screen 920, camera 930, one or more speakers 940, microphone 950, optional motor 960, data bus 990 used for communication between the components, and system client 980, which may be implemented as either a software application and/or hardware component and may be executable by processor 970 to facilitate video sharing by device 800C in a video sharing system such as depicted in FIGS. 1-2. Processor 970 may also operate I/O module 910, display screen 920, camera 930, speaker 940, microphone 950, and motor 960 in support of videos sharing as per instructions provided by system client 980. For example, I/O module 810 may send and receive audio/video data between the participants of the video sharing system; received video data may be displayed on display screen 920; camera 930 may provide video data to be sent to other videos sharing user devices 800C; speaker(s) 940 may play received audio; microphone 950 may provide audio input to be sent to other video sharing devices 800C; and motor 960 may control various elements of the device 800C or other recording devices. In some embodiments, I/O module 910 may include encryption algorithms to provide secure end-to-end communications and payment processing with other mobile devices or servers units. In other embodiments, a separate module (not shown) coupled to the processor 970 may be configuration to provide the encryption algorithms to provide secure end-to-end communications. In yet other embodiments, separate modules or recording devices may be couple to device 800C or processor 970 to provide additional control and video recording capabilities.

In accordance with embodiments described herein, system client 980 may include a creator module 982. Creator module 982 may be implementable either as a software application and/or hardware component that may be implemented as either an integrated component of system client 980 or as an independent module in communication with system client 980. Creator module 982 may be configured to perform video sharing, control routines, and payment processing routines on device 800C.

System client 980 may include a user module 984. User module 984 may be implementable either as a software application and/or hardware component that may be implemented as either an integrated component of system client 980 or as an independent module in communication with system client 980. User module 984 may be configured to perform user functions such as searching and displaying available content creators with or without map overlays. User module 984 may be configured to perform functions including accepting payment processing. User module 984 may be configured to perform functions including viewing and recording live streams from content creators. User module 984 may be configured to perform functions including display control elements for directing the content creator, or to automatically track the user to provide commands/instructions to the content creator. The input of the user's direction may be manual or automated. The output to the content creator may be manual or automated. Any combination of the manual or automated inputs and outputs may be used based on system design, available devices and components, or based on user design and preference.

Figure 10:
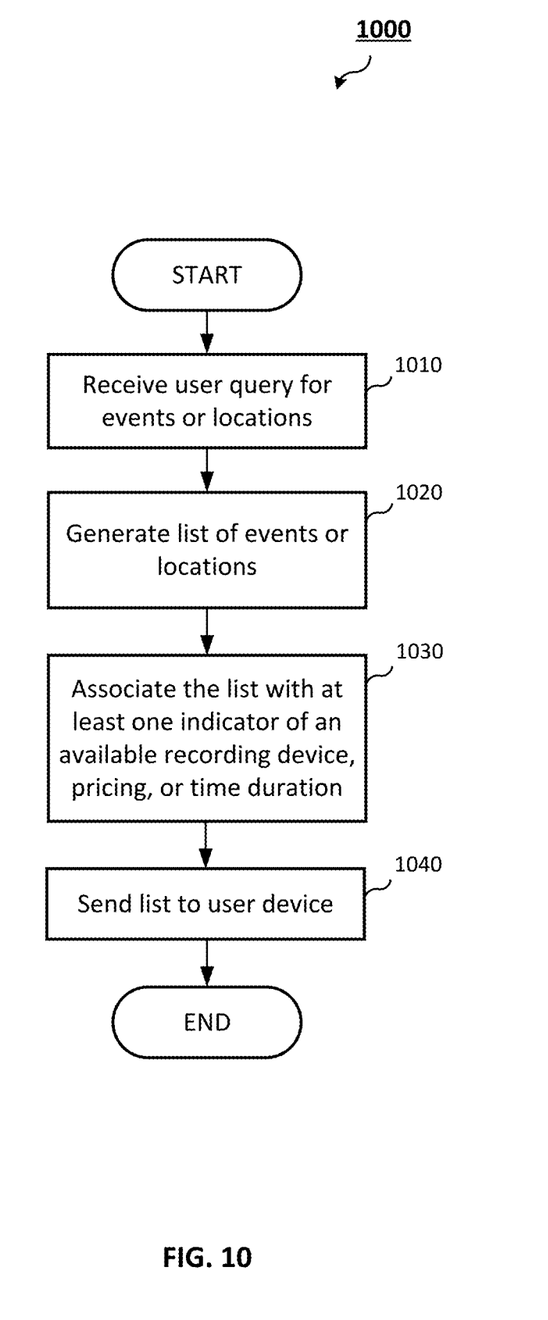
FIG. 10 is an exemplary flow diagram illustrating a method of the video sharing device. The video sharing device may be the device 100 of FIG. 1.

FIG. 10 is an exemplary flow diagram illustrating a method of the video sharing device. The video sharing device may be the device 100A of FIG. 1. The method may be methods of the system client 980. Starting at step 1010, the method may include receiving a user query for events or locations. For example, a user may search locations or events of interest to receive a list of other users offering to stream at those locations or events of interest; in other word, the query may determine a set of active video sharing devices or content creation devices at the locations or events of interest. At step 1020, the method may include generating a list of events or locations. At step 1030, the method may include associating the list with at least one indicator of an available recording device, pricing, or time duration. At step 1040, the method may include sending the list to a user device. In some embodiments, after the method sends the list to the user device, the user device may present the list for selection by the user. Once the user makes a section, the device may initialize a connection to the remote device. Afterwards, the user may then control the remote device (e.g., via sending commands to the remote device).

Figure 11:
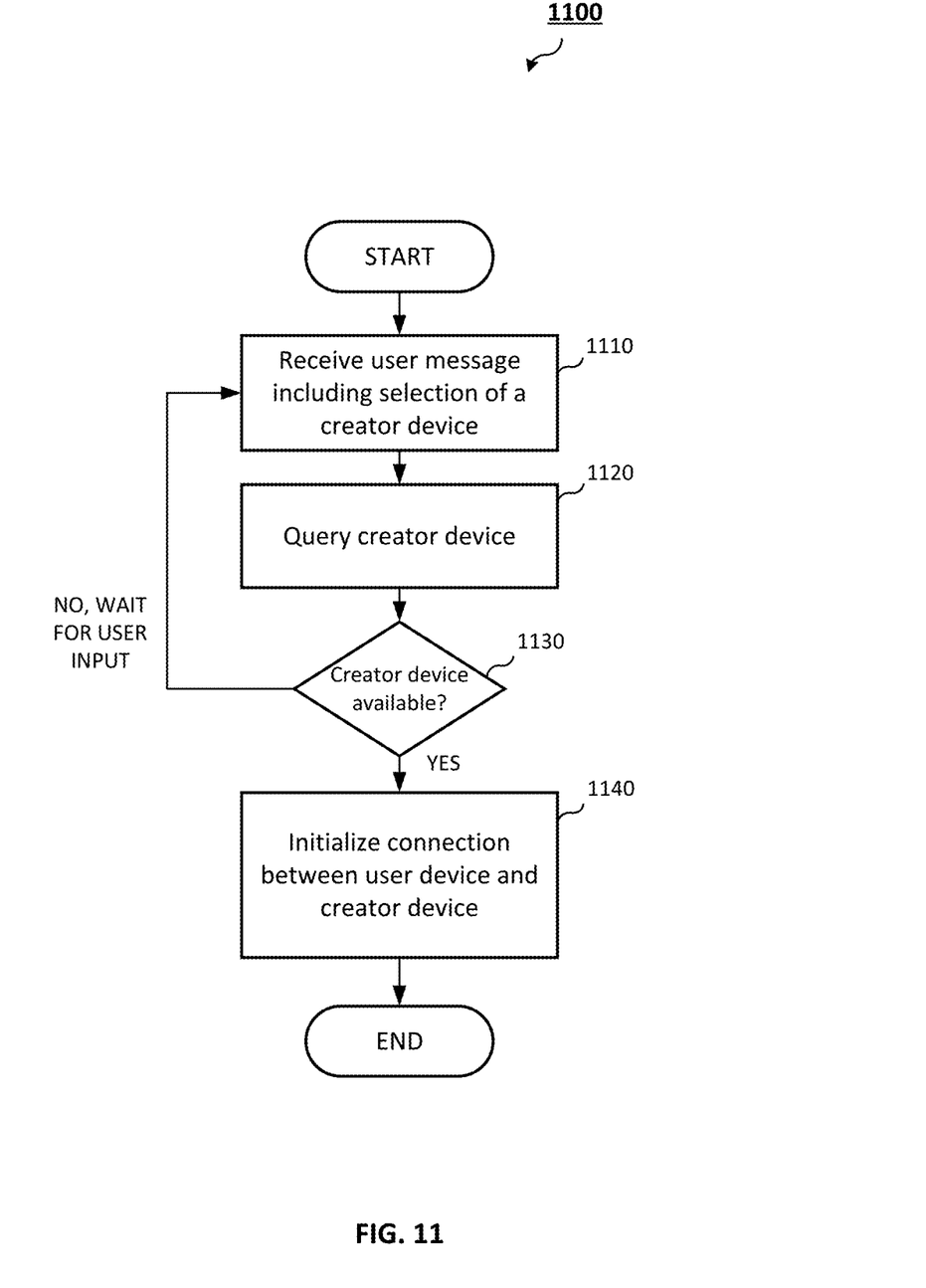
FIG. 11 is another exemplary flow diagram illustrating another method of the video sharing device. The video sharing device may be the device 100 of FIG. 1.

FIG. 11 is another exemplary flow diagram illustrating another method of the video sharing device. The video sharing device may be the device 150A of FIG. 1. The method may be methods of the system client 980. Starting at step 1110, the method may include receiving a user message including a selection of a creator device. At step 1120, the method may include querying the creator device. For example, the method may transmit a message to the remote creator device to determine if the creator device is available to stream. At step 1130, the method may determine whether the creator device is available for streaming. If the creator device is not available for streaming, the method may return to step 1110 to prompt or wait for the user to select another creator device. If the creator device is available for streaming, then the method may proceed to step 1140. At step 1140, the method may include initializing a connection between the user device and the creator device.

Figure 12:
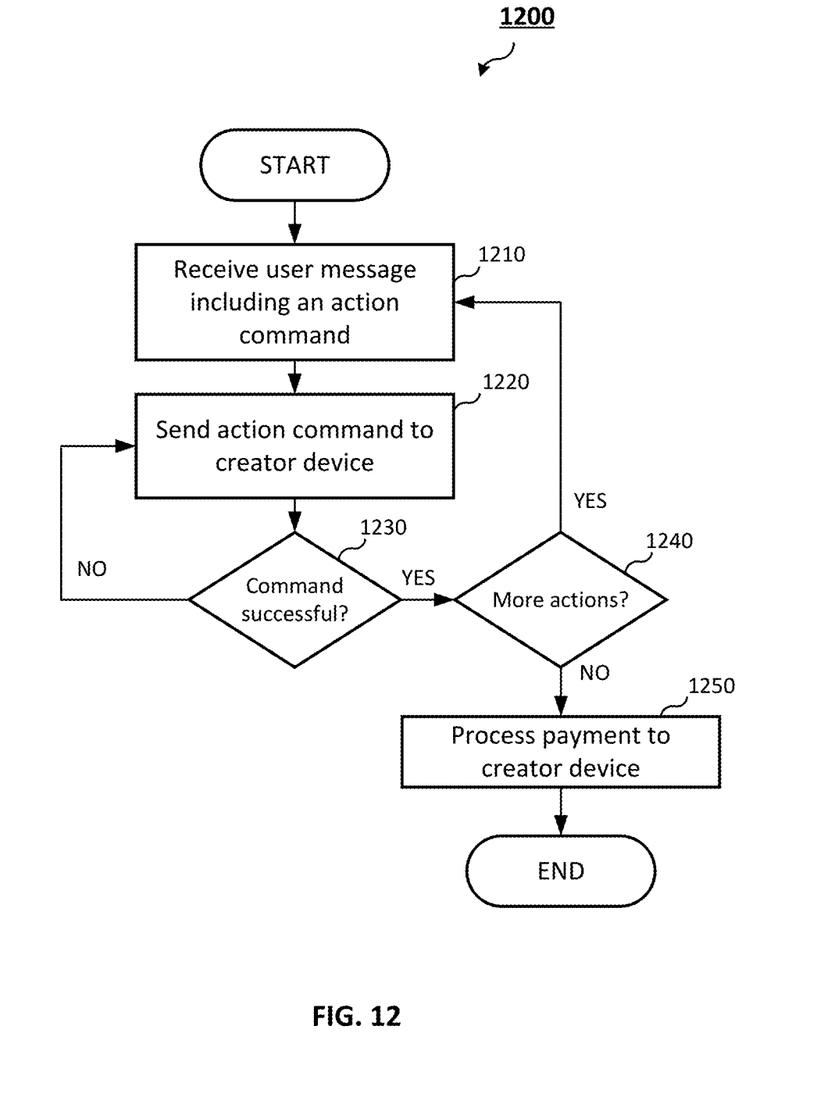
FIG. 12 is another exemplary flow diagram illustrating another method of the video sharing device. The video sharing device may be the device 100 of FIG. 1.

FIG. 12 is another exemplary flow diagram illustrating another method of the video sharing device. The video sharing device may be the device 100 of FIG. 1. The method may be methods of the system client 980. The method may include, at step 1210, receiving a user message including an action command. The method may include, at step 1220, sending an action commend to a creator device. The method may include, at step 1230, determining whether the command was successful. If the command was successful, then the method may proceed to step 1240. If the command was not successful, then the method may return to step 1220. At step 1240, the method may determine whether more actions are requested or available. If more actions are requested or available, the method may return to step 1210 to receive another user action command. If there are no actions, the method may proceed to step 1250. The method may include, at step 1250, processing payment for the streaming service provided by the creator device.

Some portions of the detailed descriptions above may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "storing," "detecting," "retrieving," "granting," "performing," "locking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specifically constructed for the required purposes, or it may be general purpose computer system selectively programmed by a computer program stored in the computer system. Such a computer program may be stored in a computer readable storage medium, such as, but not limited to, any type of disk including optical disks, CD-ROMs, DVD-ROMs, Blu-ray disks, magnetic-optical disks, read-only memories (ROMs), random access memories (RAMs), EPROMs, EEPROMs, magnetic-optical disk storage media, optical storage media, flash memory devices, solid state devices, other type of machine-accessible storage media, or any type of media suitable for storing electronic instructions, each coupled to a computer system bus.

The algorithms and displays presented herein are not inherently related to any particular computer or other apparatus. In some embodiments various general-purpose systems may be used with programs in accordance with the teachings herein, or it may prove convenient to construct a more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method implemented on a mobile content viewer device, the method comprising:
    receiving a query, from a user, for a set of active mobile video content creation devices;
    displaying information comprising a price associated with location of each of the set of active mobile video content creation devices;
    receiving a selection of one of the set of mobile active video content creation devices based on the price associated with the location of the one mobile active video content creation device;
    initializing a peer-to-peer connection for streaming video content from the selected active mobile video content creation device to the mobile content viewer device without an intermediate server;
    receiving a live video feed from the selected active mobile video content creation device via the peer-to-peer connection;
    while receiving the live video feed via the peer-to-peer connection, sending a real-time command to instruct a user of the selected active mobile video content creation device to make a physical movement; and
    receiving an updated live video feed comprising video content indicative of the physical movement of the selected active mobile video content creation device.

2. The method of claim 1, wherein the query comprises one of a keyword search or location search.

3. The method of claim 1, wherein the information associated with the set of active mobile video content creation devices further comprises one of time duration or popularity of location information associated with each of the set of mobile active video content creation devices.

4. The method of claim 1, wherein the command comprises one of a manual input from the user or an automated signal detected without manual user input.

5. The method of claim 1, wherein the real-time command comprises one of a voice command, a touch input, or an indicator associated with physical tracking of the user.

6. The method of claim 1, further comprising receiving another command for re-orientation of the selected active mobile video content creation device.

7. The method of claim 1, further comprising processing a payment prior to initializing the connection.

8. A method implemented on a mobile video content creation device, the method comprising:
    sending, at the mobile video content creation device, an indication of availability to stream video content;
    sending an indication of a price associated with a location of the mobile video content creation device;
    receiving a connection request from a remote device based on the price associated with the location of the mobile video content creation device;

initializing a peer-to-peer connection for streaming video content from the mobile video to the remote mobile video device without an intermediate server;

sending a live video feed to the remote mobile video device via the peer-to-peer connection;

while sending the live video feed via the peer-to-peer connection, receiving a real-time command, from the remote mobile video device, instructing a user of the mobile video content creation device to make a physical movement; and sending an updated live video feed comprising video content reflecting the physical movement.

9. The method of claim 8, further comprising sending an indication for time duration associated with streaming the video content.

10. The method of claim 8, further comprising receiving an indication of an electronic payment associated with streaming the video content.

11. The method of claim 8, further comprising:
determining a popularity of a location or event in proximity to the mobile video content creation device; and
sending an indication of the popularity.

12. The method of claim 8, further comprising receiving another command for re-orientation of the mobile video content creation device.

13. The method of claim 8, further comprising receiving the real-time command via one of a speech output, visual output, or haptic feedback.

* * * * *